United States Patent [19]

Komatsu et al.

[11] Patent Number: 5,037,937

[45] Date of Patent: Aug. 6, 1991

[54] NOVEL POLYCARBONATE RESINS, PROCESS FOR PRODUCTION OF SAID RESINS, AND COMPOSITIONS CONTAINING SAID RESINS

[75] Inventors: Takashi Komatsu; Masaya Okamoto, both of Ichihara, Japan

[73] Assignee: Idemitsu Petrochemical Co., Ltd., Tokyo, Japan

[21] Appl. No.: 294,906

[22] Filed: Jan. 6, 1989

[30] Foreign Application Priority Data

| Feb. 13, 1987 | [JP] | Japan | 62-029673 |
| Mar. 12, 1987 | [JP] | Japan | 62-055309 |
| Mar. 18, 1987 | [JP] | Japan | 62-061282 |
| Oct. 13, 1987 | [JP] | Japan | 62-256269 |

[51] Int. Cl.$^5$ .................................... C08G 75/00
[52] U.S. Cl. ................... 528/174; 528/202; 523/214; 524/494; 524/611
[58] Field of Search ............... 528/174, 202; 524/611, 524/494; 523/214

[56] References Cited

U.S. PATENT DOCUMENTS

| 3,897,392 | 7/1975 | Haupt et al. | 528/228 |
| 3,912,687 | 10/1975 | Haupt et al. | 528/202 |
| 4,043,980 | 8/1977 | Baror et al. | 528/202 |
| 4,155,949 | 5/1979 | Kamiyama et al. | 524/412 |
| 4,170,587 | 10/1979 | Schmidt et al. | 524/492 |
| 4,174,359 | 11/1979 | Sivaramakrishman et al. | 528/204 |
| 4,258,175 | 3/1981 | Chen | 528/174 |
| 4,420,584 | 12/1983 | Rawlings et al. | 524/611 |
| 4,831,100 | 5/1989 | Komatsu et al. | 528/198 |
| 4,888,410 | 12/1989 | Komatsu et al. | 528/198 |
| 4,902,735 | 2/1990 | Okamoto et al. | 524/151 |
| 4,918,155 | 4/1990 | Komatsu et al. | 528/202 |

FOREIGN PATENT DOCUMENTS

| 75772 | 4/1983 | European Pat. Off. |
| 133149 | 8/1982 | Japan. |
| 1163816 | 9/1969 | United Kingdom. |

Primary Examiner—Paul R. Michl
Assistant Examiner—U. K. Rajguru
Attorney, Agent, or Firm—Frishauf, Holtz, Goodman & Woodward

[57] ABSTRACT

Novel polycarbonate resins, a process for production of said polycarbonate resins, and compositions containing said polycarbonate resins and glass fibers as major components are disclosed. The polycarbonate resins have: (1) a repeating unit (I) represented by the general formula (A):

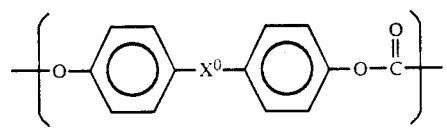

and a repeating unit (II) represented by the general formula

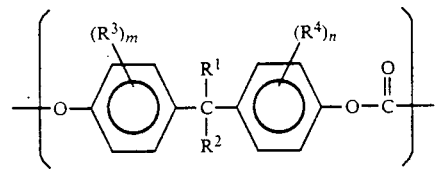

(all the symbols are as defined in the appended claims); (2) a pentahalogenophenoxy group as the end group thereof; and (3) a viscosity average molecular weight of at least 5,000. The polycarbonate resins are excellent in all of flame retardance, fluidity, impact resistance and transparency. Thus the polycarbonate resins and compositions containing them are useful for production of, e.g., moldings for which all the above characteristics are required.

34 Claims, 4 Drawing Sheets

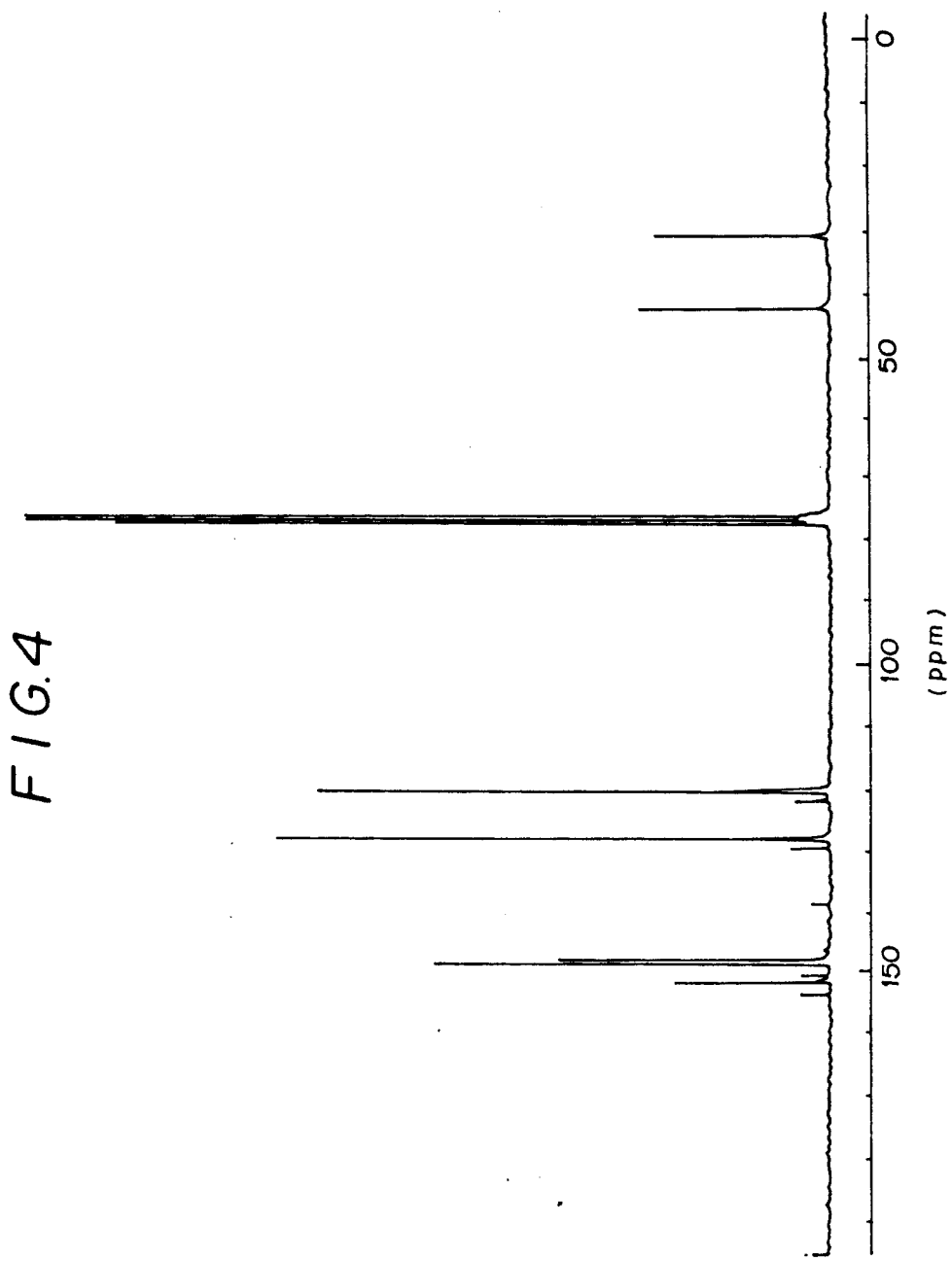

NOVEL POLYCARBONATE RESINS, PROCESS FOR PRODUCTION OF SAID RESINS, AND COMPOSITIONS CONTAINING SAID RESINS

This application is a continuation of application Ser. No. 07/139,615, filed Dec. 30, 1987, now abandoned.

BACKGROUND OF THE INVENTION

1. Field of the Invention

The present invention relates to novel polycarbonate resins, a process for production of said resins, and compositions containing said resins. More particularly, the present invention is concerned with novel polycarbonate resins which are excellent in flame retardance, impact resistance, fluidity or moldability, and further in transparency, a process for efficiently producing such polycarbonate resins, and also to compositions containing such polycarbonate resins and glass fibers as major components.

2. Description of the Related Art

As flame retardant polycarbonate resins, polycarbonate having a halogen-substituted phenoxy group (e.g., a pentabromophenoxy group, a tetrachlorophenoxy group, and a tribromophenoxy group) as an end group at the terminal thereof (Japanese Patent Publication No. 40715/1971), a copolymer of tetrahalogenobisphenolsulfone and bisphenol A (BPA) (Japanese Patent Application Laid-Open No. 123294/1976), polycarbonate having an aromatic monosulfonyl group at the terminal thereof (Japanese Patent Application Laid-Open No. 21497/1979), a copolymer of tetrabromobisphenol A and BPA (Japanese Patent Application Laid-Open No. 155233/1982), polycarbonate having a sulfonic acid salt end group (PCT Japanese Patent Application Laid-Open No. 501212/1985), and so forth are known.

These polycarbonate resins, however, are not sufficiently satisfactory in impact resistance, fluidity or moldability and transparency although they are excellent in flame retardance.

In order to improve the impact resistance of polycarbonate resins which are good in flame retardance and transparency although poor in impact resistance, polycarbonate having a thiodiphenoxy group has been developed. For example, polycarbonate produced from thiodiphenol (TDP), halogenated bisphenol and bisphenol A (BPA) (Japanese Patent Application Laid-Open No. 140597/1977), a mixture of polycarbonate produced from TDP and BPA and halogen-containing polycarbonate or halogen-containing compounds (Japanese Patent Application Laid-Open No. 50065/1979), polycarbonate having a tetrabromothiodiphenoxy group (Japanese Patent Application Laid-Open No. 99226/1981), and so forth are known.

However, these polycarbonate resins still have disadvantages in that fluidity is poor and thus they are difficult to mold, although they are excellent in flame retardance and are improved in impact resistance.

As described above, polycarbonate resins which are excellent in all of flame retardance, impact resistance, fluidity or moldability, and transparency have not yet been obtained.

It is also known that the mechanical strength and heat resistance of polycarbonate resins are increased by compounding glass fibers to the resins. However, compounding the glass fibers to the polycarbonate resins leads to a reduction in fluidity of the resulting composition, and a problem arises in that the moldability of the composition is poor. A polycarbonate resin composition which is intended to improve moldability by using polycarbonate having a specified end group has been proposed (Japanese Patent Application Laid-Open No. 133149/1982).

The above polycarbonate resin composition, however, is not sufficiently satisfactory in respect of moldability because its flow value is as low as $2.32 \times 10^{-2}$ ml/sec.

SUMMARY OF THE INVENTION

An object of the present invention is to provide novel polycarbonate resins which are excellent in all of flame retardance, impact resistance, fluidity or moldability, and transparency.

Another object of the present invention is to provide novel polycarbonate resins which have such high flame retardance that UL-94 1/16 inch (thickness) is V-0 or v-1, such high impact resistance that the Izod impact value (notched; ductile failure at ordinary temperature) is at least 50 kg·cm/cm, such high fluidity that the flow value is at least $6 \times 10^{-2}$ ml/sec, permiting molding in a thin layer form, and further which is excellent in transparency.

Still another object of the present invention is to provide a process for efficiently producing polycarbonate resins as described above.

Still another object of the present invention is to provide polycarbonate resin compositions containing the above polycarbonate resins and glass fibers as major components, which are excellent in flame retardance and moldability.

Other objects and advantages of the present invention will become apparent from the following explanation.

The present invention relates to polycarbonate resins:

(1) having a repeating unit (I) represented by the general formula (A):

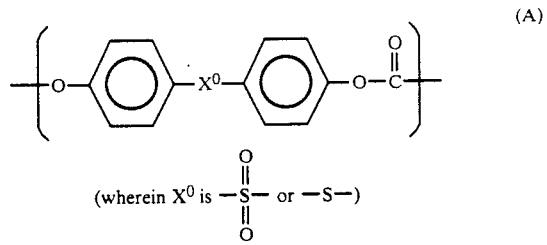

(wherein $X^0$ is $-\overset{O}{\underset{O}{\overset{\|}{S}}}-$ or $-S-$)

and a repeating unit (II) represented by the general formula (B):

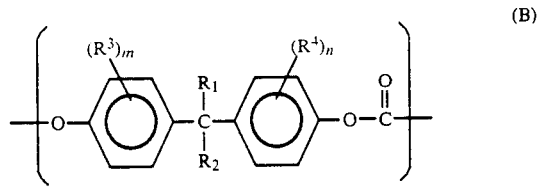

(wherein $R^1$ to $R^4$ are each a hydrogen atom or an alkyl group having 1 to 4 carbon atoms, and m and n are each an integer of 1 to 4);

(2) having, as the end group or groups, a pentahalogenophenoxy group or groups represented by the general formula (C):

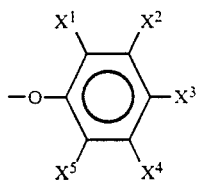

(C)

(wherein $X^1$ to $X^5$ are each a halogen atom); and (3) having a viscosity average molecular weight of at least 5,000.

The present invention further relates to a process for producing the polycarbonate resins as specified above which comprises copolymerizing bisphenol compounds represented by the general formula (D):

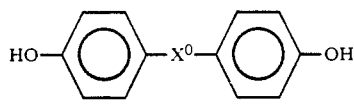

(D)

wherein $X^0$ is the same as defined in the general formula (A)), dihydroxy compounds represented by the general formula (E):

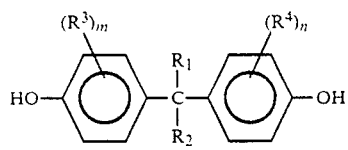

(E)

(wherein $R^1$ to $R^4$, m and n are the same as defined in the general formula (B)), and carbonate-forming compounds in the presence of pentahalogenophenols represented by the general formula (F):

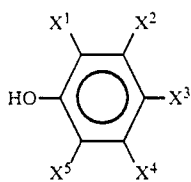

(F)

(wherein $X^1$ to $X^5$ are the same as defined in the general formula (C)).

The present invention further relates to polycarbonate resin compositions containing the polycarbonate resins as specified above and glass fibers as major components.

BRIEF DESCRIPTION OF THE DRAWINGS

FIG. 4 is an NMR spectrum (solvent: $CDCl_3$; internal standard: TMS) of the polycarbonate obtained in Example 8.

DETAILED DESCRIPTION OF THE INVENTION

Figure 1:
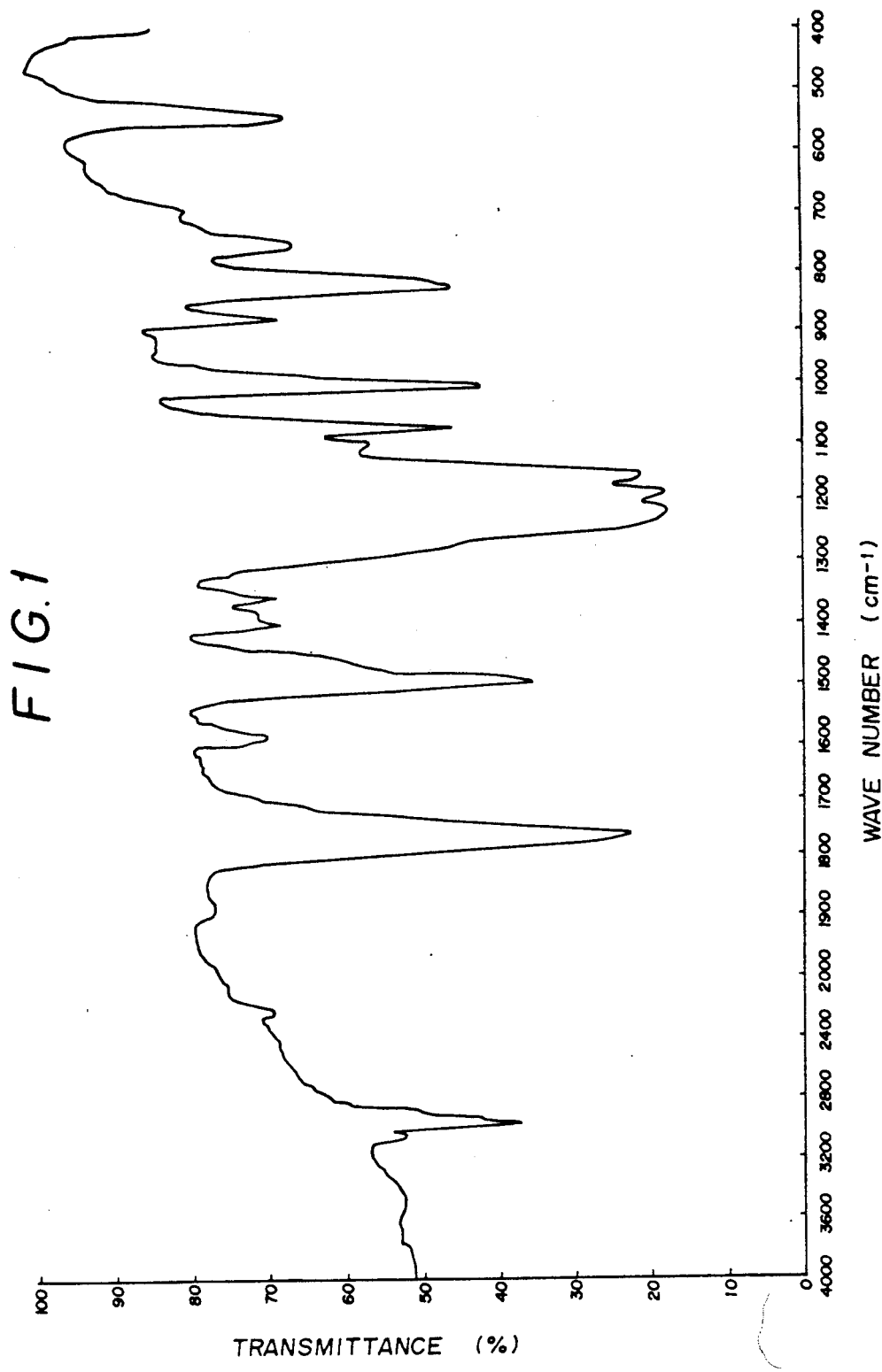
FIG. 1 is an infrared absorption (IR) spectrum (KBr tablet method) of the polycarbonate obtained in Example 2.

The polycarbonate resins of the present invention, as described above, have the repeating unit (I) represented by the general formula (A) and the repeating unit (II) represented by the general formula (B); the pentahalogeno group represented by the general formula (C) at the end, particularly at both ends thereof; and the viscosity average molecular weight of at least 5,000.

A preferred example of the polycarbonate resins of the present invention is a polycarbonate resin which comprises a repeating unit (I') represented by the formula (a):

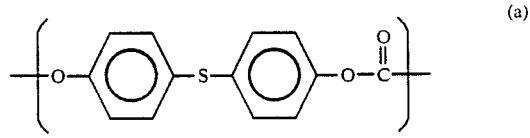

(a)

and a repeating unit (II') represented by the general formula (B) described above, has, as the end group(s), the pentahalogeno group(s) represented by the above general formula(C), and has a viscosity average molecular weight of at least 5,000. This polycarbonate resin is hereinafter referred to as "Polycarbonate (M)".

Another preferred example of the polycarbonate resins of the present invention is a polycarbonate resin which comprises a repeating unit (I") represented by the formula (b):

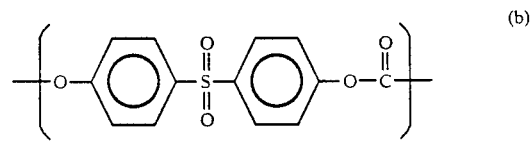

(b)

and a repeating unit (II") represented by the formula (B), has, as the end group(s), the pentahalogeno group(s) represented by the above general formula (C), and has a viscosity average molecular weight of at least 5,000. This polycarbonate resin is hereinafter referred to as "Polymer (N)".

The polycarbonate resins of the present invention will hereinafter be explained in detail with reference to the above polycarbonates (M) and (N).

The polycarbonate (M) has, as described above, the repeating unit (I') represented by the formula (a) and the repeating unit (II') represented by the formula (B)

In the general formula (B), $R^1$ to $R^4$ are each a hydrogen atom or an alkyl group having 1 to 4 carbon atoms, such as a methyl group, an ethyl group, a n-propyl group, an i-propyl group, a n-butyl group, an i-butyl group, a s-butyl group and a t-butyl group. $R^1$ to $R^4$ may be the same or different. m and n are each an integer of 1 to 4.

The molar ratio of the repeating unit (I') to the repeating unit (II') is not critical and can be determined appropriately depending on the purpose of use and so forth. The mole fraction of the repeating unit (I') based on the total of the repeating units (I') and (II') in the polycarbonate (M) is usually 0.005 to 0.4 and preferably 0.02 to 0.2. If the mole fraction of the repeating unit (I') is less than 0.005, the fluidity of the resulting polycarbonate is improved only insufficiently. On the other hand, if it is in excess of 0.4, the resulting polycarbonate is sparingly soluble in solvents, making difficult such operations as agitation.

The polycarbonate (M) has the pentahalogenophenoxy group of the general formula (C) at the end thereof, preferably at both ends thereof.

In the general formula (C), $X^1$ to $X^5$ are each a halogen atom (e.g., a chlorine atom, a bromine atom and a fluorine atom). $X^1$ to $X^5$ may be the same or different.

Representative examples of the pentahalogenophenoxy group are a pentabromophenoxy group, a pentachlorophenoxy group and a pentafluorophenoxy group.

In connection with the degree of polymerization of the polycarbonate (M), the viscosity average molecular weight is at least 5,000, with the range of 10,000 to 30,000 being preferred. If the viscosity average molecular weight is less than 5,000, mechanical strength such as impact resistance of the resulting polycarbonate is poor.

The polycarbonate (M) may be any of a random copolymer, a block copolymer, an alternating copolymer and so forth as long as the above requirements that the copolymer has the repeating units (I') and (II'), has the pentahalogenophenoxy group(s) as the end group(s), and has the viscosity average molecular weight of at least 5,000 are satisfied.

The polycarbonate (M) may contain a small amount of repeating unit other than the repeating units (I') and (II') in the molecular chain thereof within the range that the desired characteristics of the polycarbonate (M) are not deteriorated.

The polycarbonate (M) can be produced by various methods. In accordance with a typical method, the polycarbonate (M) can be efficiently produced by reacting thiodiphenol having the formula (d):

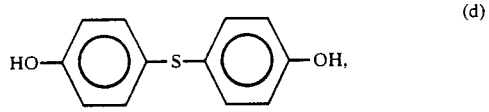

(d)

a dihydroxy compound represented by the general formula (E) described above, and a carbonate-forming compound in the presence as a molecular weight controlling agent of pentahalogenophenol represented by the general formula (F) as described above.

Representative examples of the dihydroxy compound represented by the above general formula (E) are 2,2-bis(4-hydroxyphenyl)propane (bisphenol A (BPA)), bis(4-hydroxyphenyl)methane, 1,1-bis(4-hydroxyphenyl)ethane, 1,1-bis(4-hydroxyphenyl)propane, 2,2-bis(4-hydroxyphenyl)butane, 2,2-bis(4-hydroxyphenyl)pentane, 2,2-bis(4-hydroxyphenyl)isopentane, 2,2-bis(4-hydroxyphenyl)hexane, 2,2-bis(4-hydroxyphenyl)isohexane, 4,4-dihydroxytriphenylmethane, 4,4-dihydroxytetraphenylmethane, 1,1-bis(4-hydroxyphenyl)cyclohexane, 2,2-bis(4,4-hydroxy-3-methylphenyl)propane, and 2,2-bis(4,4-hydroxy-3,5-dimethylphenyl)propane.

As the above carbonate-forming compound, phosgene is usually used. In addition, various compounds other than phosgene, such as bromophosgene, diphenyl carbonate, di-p-tolylcarbonate, phenyl p-tolylcarbonate, di-p-chlorophenyl carbonate, dinaphthyl carbonate and the like can be used.

In the above method, it is necessary for the pentahalogenophenol of the general formula (F) to be present as a molecular weight controlling agent in the reaction system.

Representative examples of pentahalogenophenols which can be used include pentabromophenol, pentachlorophenol, and pentafluorophenol.

In the above method, the repeating unit (I') represented by the formula (a) is formed from the thiodiphenol of the formula (d) and the carbonate-forming compound; the repeating unit (II') represented by the general formula (B) is formed from the dihydroxy compound of the general formula (E) and the carbonate-forming compound; and the pentahalogenophenoxy group represented by the general formula (C) as the end group is formed from the pentahalogenophenol represented by the general formula (F).

Thus the amounts of the thiodiphenol of the formula (d) and the dihydroxy compound of the general formula (E) to be charged is determined depending on the mole fraction of the repeating unit (I') or the repeating unit (II') in the desired polycarbonate. The amounts of the pentahalogenophenol and the carbonate-forming compound used specify the degree of polymerization of each of the repeating units (I') and (II'), and the degree of polymerization of the resulting polycarbonate, i.e., the molecular weight thereof. Thus the amounts of the pentahalogenophenol and the carbonate-forming compound to be charged are determined so that the molecular weight of the resulting polycarbonate falls within the above specified range. More specifically the pentahalogenophenol is added in such an amount that it is bonded, as an end group, preferably to both ends of the resulting polycarbonate, or in an amount somewhat larger than the above amount.

In accordance with the above method, the polycarbonate (M) is produced by carrying out the reaction in a liquid medium. More specifically, the polycarbonate (M) can be produced by known polymerization techniques such as the interfacial polymerization method and the pyridine method.

For example, the thiodiphenol of the formula (d) and the dihydroxy compound of the general formula (E) which have been dissolved in an aqueous solution of alkali such as sodium hydroxide, potassium hydroxide, and sodium carbonate are added to an inert organic solvent such as methylene chloride, chloroform, chlorobenzene and carbon tetrachloride, and then carbonateforming compound such as phosgene is blown thereinto to proceed interfacial polycondensation. In this reaction, the pentahalogenophenol of the general formula (F) as a molecular weight controlling agent is previously added to the reaction system, or added at a stage that the reaction has proceeded to some extent. It is effective that tertiary amines such as triethylamine be added to the reaction system as dehydrohalogenation agents. It is preferred that the reaction system be cooled with water or ice because the reaction is exothermic. It is also preferred that since the reaction system becomes acidic as the reaction proceeds, the pH of the reaction system be maintained at 10 or more by adding an alkali while measuring with a pH meter.

In the above interfacial polymerization method, it is effective that the dihydroxy compound of the general formula (E) and the carbonate-forming compound are previously reacted to form a polycarbonate oligomer, and then the polycarbonate oligomer thus obtained, the thiodiphenol of the formula (d) and the pentahalogenophenol of the general formula (F) are reacted in the same manner as described above to proceed interfacial polycondensation.

In accordance with the pyridine method, the starting materials of the thiodiphenol of the general formula (d), the dihydroxy compound of the general formula (E) and the pentahalogenophenol of the general formula (F) are dissolved in a mixed solvent of pyridine and an inert solvent, and then the carbonate-forming compound such as phosgene is blown into the above-formed solution, whereupon the desired polycarbonate (M) is formed.

More specifically, the following methods are suitable to employ in the production of the polycarbonate (M).

(1) The thiodiphenol and the carbonate-forming compound such as phosgene are previously reacted to form a polycarbonate oligomer, and the polycarbonate oligomer thus formed, the dihydroxy compound such as bisphenol A and the pentahalogenophenol are reacted in the presence of a solvent, an aqueous alkali solution, a dehydrochlorination agent, and so forth which are suitable for the reaction.

(2) A polycarbonate oligomer formed from the dihydroxy compound, e.g., bisphenol A (or the thiodiphenol) and the carbonate-forming compound, e.g., phosgene is reacted with the thiodiphenol (or the dihydroxy compound) and the pentahalogenophenol in the presence of a solvent, an aqueous alkali solution, a dehydrochlorination agent and so forth which are suitable for use in the reaction, and at a suitable stage of the reaction, the carbonate-forming compound is blown in the reaction system.

(3) A polycarbonate oligomer to be derived from the dihydroxy compound, e.g., bisphenol A and the carbonateforming compound, e.g., phosgene, and a polycarbonate oligomer to be derived from the thiodiphenol and the carbonate-forming compound are previously formed, and these polycarbonate ligomers are reacted in the presence of the pentahalogenophenol and also a solvent, an aqueous alkali solution, a dehydrochlorination agent and so forth which are suitable for use in the reaction.

(4) In the above methods, polymerization is carried out at two or more stages; that is, a multi-stage polymerization is effectively employed.

The polycarbonate (N) has, as described above, the repeating unit (I'') represented by the formula (b) as described above and the repeating unit (II'') represented by the formula (B) as described above.

In the polycarbonate (N), the mole fraction of the repeating unit (I'') is not critical and can be determined appropriately depending on the purpose of use and so forth. The mole fraction of the repeating unit (I'') based on the total of the repeating units (I'') and (II'') in the polycarbonate (N) is usually 0.005 to 0.4, preferably 0.01 to 0.2 and most preferably 0.02 to 0.1.

The viscosity average molecular weight of the polycarbonate (N) is at least 5,000, with the range of 10,000 to 30,000 being preferred, as in the polycarbonate (M).

The polycarbonate (N) has the above repeating units (I'') and (II''), and the pentahalogenophenoxy group at the end thereof, preferably at both ends thereof. The polycarbonate (N) may be any of a random copolymer, a block copolymer, an alternating copolymer and so forth.

The polycarbonate (N) may contain a small amount of repeating unit other than the repeating units (I'') and (II'') in the molecular chain thereof.

The polycarbonate (N) can be produced by various methods. Two methods which are preferably employed in the production of the polycarbonate (N) are described below in detail.

In accordance with the first method, bisphenolsulfone (BPS) having the formula (e):

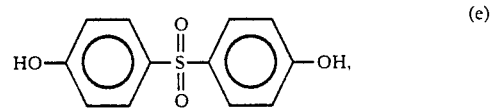

dihydroxy compounds represented by the general formula (E) as describe above, and pentahalogenophenol represented by the general formula (F):

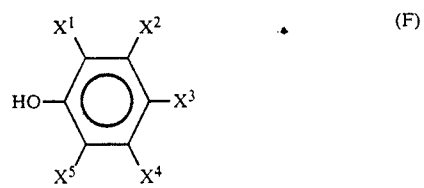

and further a solvent (e.g., methylene chloride, chlorobenzene, pyridine, chloroform and carbon tetrachloride) and an aqueous alkali solution mutually insoluble with the solvent (e.g., an aqueous solution of sodium hydroxide, potassium hydroxide, or sodium carbonate) are mixed in predetermined ratios and stirred, and then the carbonate-forming compound (e.g., phosgene) is blown into the resulting mixture to proceed interfacial polymerization. In this reaction, it is preferred that the reaction system be cooled with water or ice because the reaction is exothermic. It is also preferred that since the reaction system becomes acidic as the reaction proceeds, the pH of the reaction system be maintained at 10 or more by adding an alkali while measuring with a pH meter.

The bisphenolsulfone of the formula (e) constitutes the repeating unit (I'') of the polycarbonate (N), and the dihydroxy compound of the general formula (E) constitutes the repeating unit (II'') of the polycarbonate (N). Thus the ratio of bisphenolsulfone to the dihydroxy compound to be charged is determined depending on the mole fraction of the repeating unit (I'') or the repeating unit (II'') in the polycarbonate (N). The amounts of pentahalogenophenol and the carbonate-forming compound used specify the degree of polymerization of each of the repeating units (I'') and (II''), and the degree of polymerization of the resulting polycarbonate, i.e., the molecular weight thereof. Thus the amounts of the pentahalogenophenol and the carbonate-forming compound to be charged are determined so that the molecular weight of the resulting polycarbonate falls within the above specified range.

In blowing the carbonate-forming compound, the rate of the carbonate-forming compound to be blown per hour is controlled so that the necessary amount of the carbonate-forming compound is introduced at the end of the reaction.

On introducing the reaction mixture as obtained above in a large amount of a precipitating agent, e.g., methanol, the polycarbonate (N) is precipitated.

In the above reaction, various carbonate-forming compounds such as bromophosgene, diphenyl carbonate, di-p-tolylcarbonate, phenyl p-tolylcarbonate, di-p- chlorophenyl carbonate and dinaphthyl carbonate can be used, as well as phosgene, as in the polycarbonate (M).

In accordance with the second method, a carbonate oligomer is previously prepared from the dihydroxy compound and the carbonate-forming compound; the polycarbonate oligomer thus obtained, bisphenolsulfone and the pentahalogenophenol and further a solvent capable of dissolving the polycarbonate oligomer (e.g., methylene chloride), an aqueous solution of alkali (e.g., an aqueous sodium hydroxide solution), and such compounds as triethylamine and trimethylbenzylammonium chloride are mixed in predetermined ratios and mixed; and the reaction mixture is then poured into a large amount of a precipitating agent (e.g., methanol), whereupon the polycarbonate (N) is precipitated.

In the case of the above method, the polymer grows through the reaction of the chloroformate group existing at both ends of the oligomer and the hydroxy group existing at both ends of the bisphenolsulfone. Therefore, it is unnecessary to blow the carbonate-forming compound during the above reaction.

In the polycarbonate (N) produced by the above method, the degree of polymerization of the polycarbonate oligomer is as such a degree of polymerization of the repeating units (II''), i.e., is equal to the number of the repeating units (II'') bonded together; one repeating unit (I'') is present between two bonded repeating unit (II'') segments; and the pentahalogenophenoxy group is bonded preferably to both ends of the polycarbonate.

In addition, the polycarbonate (N) can be produced efficiently by the methods (1) to (4) as described for the polycarbonate (M).

The polycarbonate resin compositions of the present invention contain the polycarbonate resins as described above and glass fibers as major components.

Glass fibers used in the polycarbonate resin compositions of the present invention are not critical; various types of glass fibers can be used in the present invention. For example, glass fibers conventionally used in reinforcement of resins, such as non-alkali glass fibers and low alkali glass fibers can be used.

The glass fibers are not critical in the form thereof and may be used in the form of, e.g., roving, chopped strand, or stand. If, however, the fiber diameter is too large, the strength of the resulting resin composition may drop and also the appearance may become poor. On the other hand, if the fiber diameter is too small, the fibers may be broken at the time of kneading or molding, leading to a reduction of the strength of the resulting resin composition.

If desired, for the purpose of more increasing the flame retardance and mechanical strength of the polycarbonate resin compositions, the glass fibers may be subjected to a surface treatment using a coupling agent, such as aminosilane, epoxysilane, borane, vinylsilane and methacrylsilane-based couplding agents, or such compounds as chromium complexes and boron compounds.

Particularly preferred among the glass fibers are those having a fiber length of 1 to 8 mm, especially 2 to 7 mm, and a fiber diameter of not more than 20 μm, especially 3 to 15 μm, and subjected to a surface treatment using a silane coupling agent.

In the polycarbonate resin compositions of the present invention, the mixing ratio of the polycarbonate resin to the glass fiber is not critical and can be determined appropriately depending on the purpose of use, the desired characteristics and so forth. The amount of the glass fiber compound is usually 1 to 100 parts by weight, preferably 5 to 50 parts by weight per 100 parts by weight of the polycarbonate resin.

In the polycarbonate resins compositions of the present invention, as well as the main components of the polycarbonate resin and the glass fiber, various additives such as an inorganic filler, a stabilizer and a colorant can be added, if necessary.

The polycarbonate resin compositions of the present invention can be kneaded by the use of a kneader such as an extruder. In molding of the polycarbonate resin compositions of the present invention, injection molding and so forth can be employed.

The present invention produces various advantages. Some of the major advantages are shown below.

(1) The polycarbonate resins of the present invention are excellent in all of flame retardance, fluidity, impact resistance and transparency. More specifically, UL-94 1/16 inch (thickness) as a measure of flame retarance is V-o, the Izod impact strength (notched, ductile failure at ordinary temperature) as a measure of impact resistance is not less than 50 kg·cm/cm, and the flow value as a measure of fluidity is not less than $5 \times 10^{-2}$ ml/sec.

(2) The polycarbonate resins having characteristics as described above can be efficiently produced by the process of the present invention.

(3) The polycarbonate resin compositions of the present invention are excellent in flame retardance and impact resistance, and further are excellent in fludity and, therefore, in moldability.

(4) The polycarbonate resins and polycarbonate resin compositions of the present invention are useful as materials for use in production of e.g., home electric appliances and office automation (OA) devices, or as construction materials, for example.

The present invention is described in greater detail with reference to the following examples, although it is not intended to be limited thereto.

PREPARATION EXAMPLE 1

Preparation of Polycarbonate Oligomer of Bisphenol A 91 g of bisphenol A, 330 ml of methylene chloride and 560 ml of a 2.0 N aqueous solution of sodium hydroxide were introduced in a 2-liter flask equipped with a stirrer, and phosgene was blown into the resulting mixture for 70 minutes while stirring and cooling on a water bath. On allowing the reaction mixture to stand at room temperature, a methylene chloride solution of oligomer was isolated as a lower layer. The concentration of the oligomer in the solution was 320 g/l, the number average molecular weight of the oligomer was 850, and the concentration of the chloroformate group was 0.7 mol/l.

EXAMPLE 1

In a 50-liter reactor equipped with a stirrer were introduced 10,000 ml of the polycarbonate oligomer as prepared in Preparation Example 1, 2,450 ml of an aqueous solution of thiodiphenol (TDP) and pentabromophenol (PBP) (consisting of 149 g (0.68 mol) of TDP, 291 g (0.60 mol) of PBP, 300 ml of a 26% aqueous NaOH solution and 1,710 ml of water), and 2.25 g (0.022 mol) of triethylamine, and the resulting mixture was stirred at 500 rpm. After 60 minutes, 4,350 ml of an aqueous solution of bisphenol A (BPA) (consisting of 458 g (2.0 mol) of BPA, 890 ml of a 26% aqueous NaOH solution and 3,020 ml water) and 5,700 ml of methylene chloride were added, and the resulting mixture was stirred.

After 60 minutes, the reaction mixture was separated into an aqueous layer and a methylene chloride layer containing the copolymer formed. This methylene chloride layer was washed with water, an acid (0.1 N hydrochloric acid) and then with water. The methylene chloride was distilled away under reduced pressure at 40° C. to obtain a white powder of the copolymer. This white copolymer powder was dried at 120° C. for one day and night, and then melted in an extruder and pelletized. The viscosity average molecular weight of the copolymer was 18,000. The mole fraction of the repeating unit (I') in the copolymer was 0.05.

The above pellets were injection molded at a temperature of 280° C. and under an injection pressure of 56 kg/cm$^2$ by the use of an injection molding machine to obtain a test piece. This test piece was measured for Izod impact strength, heat distortion temperature, and flame retardance. The flow value of the copolymer was measured with a Koka type flow tester. The bromine content of the copolymer was 6.9% by weight. These results are shown in Table 1.

EXAMPLE 2

An aqueous BPA solution (prepared by dissolving 60 kg of BPA in 400,000 ml of a 5% aqueous sodium hydroxide solution), an aqueous solution of TDP and PBP (prepared by dissolving 33.7 kg of TDP and 32.7 kg of 400,000 ml of a 5% aqueous sodium hydroxide solution), methylene chloride and an aqueous triethylamine solution (concentration: 33 g/1,000 ml) were introduced in a tubular reactor (inner diameter: 10 mm; tube length: 10 m) through an orifice plate at rates of 138,000 ml/hr, 27,000 ml/hr, 80,000 ml/hr and 100,000 ml/hr, respectively, and phosgene was blown thereinto as a parallel flow at a rate of 11 kg/hr to effect polymerization.

The above tubular reactor was of the double tube type, and cooling water was passed through the jacket portion to maintain the discharge temperature of the reaction mixture at 25° C.

After the reaction in the tubular reactor, the reaction mixture was further reacted in a 100 liter vessel type reactor for 3 hours. At the end of the time, the resulting copolymer solution was treated in the same manner as in Example 1 to obtain a white powder of the copolymer. The copolymer was analyzed in the same manner as in Example 1. The results are shown in Table 1.

Figure 2:
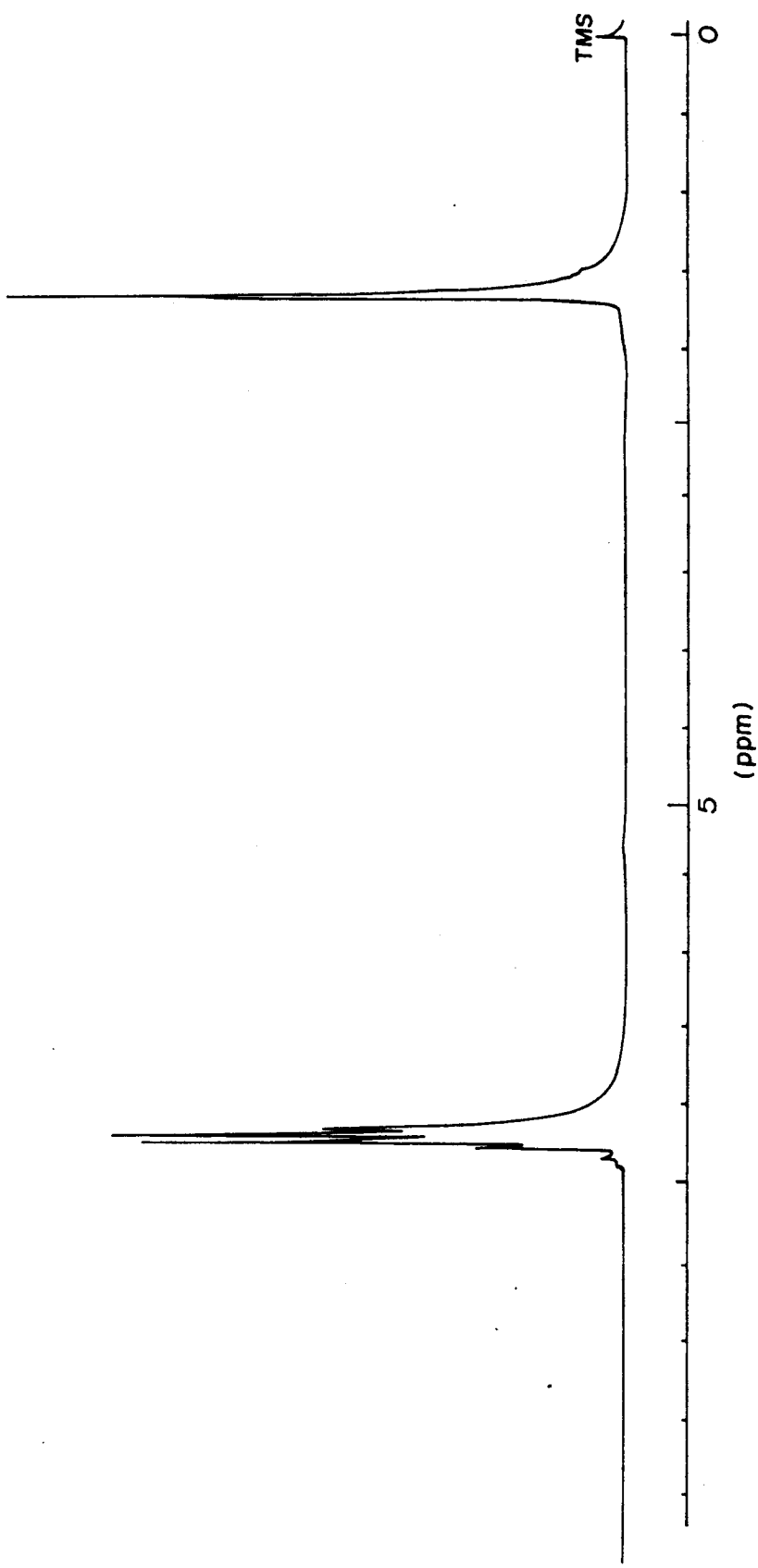
FIG. 2 is a nuclear magnetic resonance (NMR) spectrum (solvent: deuterochloroform ($CDCl_3$); internal standard: trimethylsilane (TMS)) of the polycarbonate obtained in Example 2.

An infrared absorption (IR) spectrum of the copolymer as measured by the KBr method is shown in FIG. 1, and a nuclear magnetic resonance (NMR) spectrum of the copolymer as measured using CDCl$_3$ as the solvent is shown in FIG. 2.

EXAMPLE 3

Preparation of Oligomer

An aqueous BPA solution (the same as in Example 2), an aqueous solution of TDP and PBP (the same as in Example 2), methylene chloride, and an aqueous triethylamine solution (the same as in Example 2) were introduced in the same tubular reactor as used in Example 2 at rates of 138,000 ml/hr, 27,000 ml/hr, 80,000 ml/hr and 100,000 ml/hr, respectively, and phosgene was blown thereinto as a parallel flow at a rate of 11 kg/hr to effect polymerization. On allowing the reaction mixture to stand at room temperature, a methylene chloride solution of oligomer was isolated as a lower layer.

The number average molecular weight of the oligomer was 820, and the concentration of the chloroformate group was 0.6 mol/l.

Production of Polycarbonate 500 ml of the oligomer obtained above, 250 ml of an aqueous BPA solution (containing 30.8 g of BPA and 18.0 g of NaOH), 0.061 g of triethylamine and 300 ml of methylene chloride were introduced in a 2 liter-reactor, and then the reaction was performed for 1 hour while stirring at 500 rpm. After the completion of the reaction, the reaction mixture was treated in the same manner as in Example 1 to obtain a white powder of copolymer. The copolymer thus obtained was analyzed in the same manner as in Example 1. The results are shown in Table 1.

EXAMPLE 4

The procedure of Example 1 was repeated with the exception that the amount of TDP in the aqueous solution of TDP and PBP was changed to 57.6 g (0.26 mol). The results are shown in Table 1.

EXAMPLE 5

In a 50-liter reactor equipped with a stirrer were introduced 10,000 ml of the carbonate oligomer as prepared in Preparation Example 1, 8,400 ml of an aqueous solution of TDP and PBP (consisting of 645 g (296 mol) of TDP, 322 g (0.66 mol) of PBP, 1,500 ml of a 26% aqueous NaOH solution, and 6,300 ml of water), 3.74 g (0.037 mol) of triethylamine, and 6,000 ml of methylene chloride, which were then stirred for 60 minutes to effect polymerization. After the completion of the reaction, the reaction mixture was treated in the same manner as in Example 1, and the copolymer thus obtained was analyzed in the same manner as in Example 1. The results are shown in Table 1.

COMPARATIVE EXAMPLE 1

In a 50-liter reactor equipped with a stirrer were introduced 10,000 ml of the carbonate oligomer as prepared in Preparation Example 1, 770 ml of an aqueous solution of tetrabromobisphenol A (TBA) (consisting of 272 g (0.50 mol) of TBA, 55.3 g (1.38 mol) of NaOH and 500 ml of water), 90.1 g (0.60 mol) of p-tert-butylphenol (PTBP) and 2.25 g (0.022 mol) of triethylamine, which were then stirred at 500 rpm. After 60 minutes, an aqueous solution of BPA (consisting of 400 g (1.75 mol) of BPA, 233 g (5.83 mol) of NaOH and 2,980 ml of water), and 5,700 ml of methylene chloride were introduced in the reactor, and the resulting mixture was stirred for 60 minutes to effect polymerization. After the completion of the reaction, the reaction mixture was treated in the same manner as in Example 1, and the copolymer thus obtained was analyzed in the same manner as in Example 1. The results are shown in Table 1.

TABLE 1

| Run No. | Mole Fraction of Repeating Unit (I')[1] | Bromine Content of Copolymer (wt %)[2] | Heat Distortion Temperature (°C.) | Viscosity Average Molecular Weight[3] | Flow Value (ml/sec) [4] | Izod Impact Resistance (notched) (kg·cm/cm)[5] | Flame Retardance [6] | Transparency |
|---|---|---|---|---|---|---|---|---|
| Example 1 | 0.05 | 6.9 | 131.0 | 18,000 | $8.5 \times 10^{-2}$ | 72 | V-0 | transparent |
| Example 2 | 0.10 | 7.1 | 128.0 | 17,000 | $10.5 \times 10^{-2}$ | 66 | V-0 | " |
| Example 3 | 0.07 | 6.8 | 129.0 | 18,500 | $7.2 \times 10^{-2}$ | 69 | V-0 | " |
| Example 4 | 0.02 | 6.8 | 132.0 | 18,800 | $6.1 \times 10^{-2}$ | 81 | V-0 | " |
| Example 5 | 0.18 | 7.2 | 133.5 | 17,000 | $11.1 \times 10^{-2}$ | 63 | V-0 | " |
| Comparative Example 1 | 0.05 | 6.5 | 137.5 | 17,600 | $5.1 \times 10^{-2}$ | 11 | V-0 | " |

[1] The mole fraction of the repeating unit (I') was determined by burning a sample, absorbing the resulting gases in water, and measuring the concentration of $H_2SO_4$ using barium ions.
[2] The bromine content of the copolymer was determined by alkali-decomposing a sample and measuring the amount of bromine by the Volhard method.
[3] The viscosity average molecular weight (Mv) was determined by calculating from a viscosity of a methylene solution as measured at 20° C. by the use of a Ubbellohde viscometer.
[4] The flow value was measured according to JIS K-7210 (load: 160 kg/cm$^2$).
[5] The Izod impact resistance was measured according to JIS K-7110 using a test piece of ⅛ inch in thickness.
[6] The flame retardance was measured according to UL-94 (Underwriter's Laboratories Subject 94) using a test piece of 1/16 inch in thickness.

PREPARATION EXAMPLE 2

Preparation of Polycarbonate Oligomer of Bisphenol A

In a 2-liter flask equipped with a stirrer were introduced 91 g of bisphenol A (PBA), 330 ml of methylene chloride and 560 ml of a 1.7 N aqueous solution of sodium hydroxide, and phosgene was blown thereinto while stirring and cooling the resulting mixture on a water bath. On allowing the reaction mixture to stand at room temperature, a methylene chloride solution of oligomer was separated as a lower layer.

The concentration of the oligomer in the oligomer solution was 300 g/l, the number average molecular weight of the oligomer was 550, and the concentration of the chloroformate group was 1.0 mol/l.

EXAMPLE 6

In a 50-liter reactor equipped with a stirrer were introduced 8,000 ml of the oligomer as prepared in Preparation Example 2, 640 ml of an aqueous solution of bisphenolsulfone (consisting of 123 g (0.49 mol) of bisphenolsulfone, 69 g of sodium hydroxide and 520 ml of water), and 4.4 g (0.043 mol) of triethylamine, which were then stirred at 500 rpm. After ten minutes, an aqueous solution of pentabromophenol (consisting of 215 g (0.44 mol) of pentabromophenol, 35.1 g of sodium hydroxide and 2,800 ml of water) was added, and the resulting mixture was stirred. After 50 minutes, 4,900 ml of an aqueous solution of bisphenol A (consisting of 510 g (2.24 mol) of bisphenol A, 260 g of sodium hydroxide and 4,400 ml of water) and 6,000 ml of methylene chloride were added, and the resulting mixture was stirred.

After stirring for 60 minutes, the reaction mixture was separated into an aqueous layer and a methylene chloride layer containing the copolymer formed above. This methylene layer was washed with water, an acid (0.1 N hydrochloric acid) and then with water. The methylene chloride was distilled away under reduced pressure at 40° C. to obtain a white powder of the copolymer. This white copolymer powder was dried at 120° C. for one day and night, and then melted in an extruder and pelletized.

The glass transition temperature (Tg) of the copolymer was 153.8° C. The viscosity average molecular weight of the copolymer was 17,600. The molecular weight distribution of the copolymer as determined by gel permeation chromatography was such that a single peak appeared at the above value. The mole fraction of the repeating unit (I'') in the copolymer was 0.02.

The pellets as obtained above were injection molded at a temperature of 280° C. and under an injection pressure of 56 kg/cm$^2$ by the use of an injection molding machine to obtain a test piece. This test piece was measured for Izod impact strength and flame retardance, and also its transparency was determined with the eye. The flow value of the copolymer was measured with a Koka type flow meter. The bromine content of the copolymer as determined in the same manner as described in Table 1 was 5.8% by weight. These results are shown in Table 2.

EXAMPLES 7 TO 11

Copolymers wherein the mole fraction of the repeating unit (I'') and the bromine content were varied were produced in the same manner as in Example 6 with the exception that the amounts of the starting materials such as bisphenolsulfone, carbonate oligomer and pentabromophenol were varied. Characteristics of the copolymers are shown in Table 2.

Figure 3:
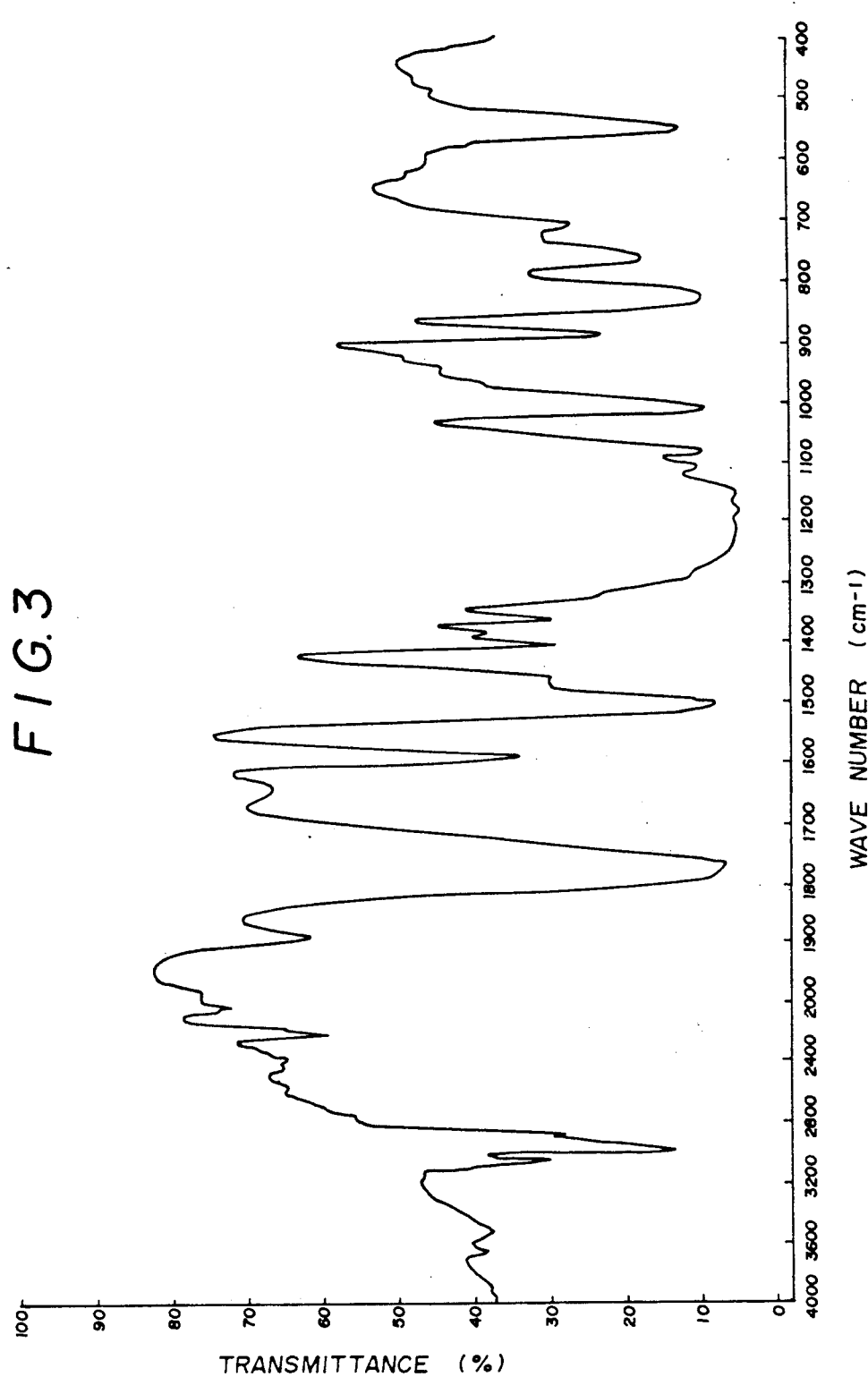
FIG. 3 is an IR spectrum (KBr tablet method) of the polycarbonate obtained in Example 8.

An infrared absorption (IR) spectrum of the copolymer of Example 8 as determined by the KBr method is shown in FIG. 3, and a nuclear magnetic resonance (NMR) spectrum of the copolymer as determined using CDCl$_3$ as the solvent is shown in FIG. 4.

COMPARATIVE EXAMPLE 2

A copolymer consisting of the repeating unit (II'') alone and terminated in pentabromophenol at both ends was produced in the same manner as in Example 6 with the exception that bisphenolsulfone was not used. Characteristics of the copolymer are shown in Table 2.

COMPARATIVE EXAMPLE 3

A copolymer was produced in the same manner as in Example 6 with the exception that the aqueous solution of pentabromophenol was replaced by 5,000 ml of an aqueous solution of p-tert-butylphenol (consisting of 44.5 g of p-tertbutylphenol, 351 g (1.40 mol) of bisphenolsulfone, 211 g of sodium hydroxide and 4,600 ml of water). Characteristics of the copolymer are shown in Table 2.

COMPARATIVE EXAMPLE 4

A copolymer was produced from tetrabromobisphenolsulfone and bisphenol A in the same manner as in Example 6 with the exception that the aqueous solution of bisphenolsulfone was replaced by 897 ml of an aqueous solution of tetrabromobisphenol (consisting of 377 g (0.67 mol) of tetrabromobisphenolsulfone, 120 g of sodium hydroxide and 520 ml of water), and the aqueous solution of pentabromophenol was replaced by an aqueous solution of p-tert-butylphenol (consisting of 52.8 g of p-tert-butylphenol, 35.1 g of sodium hydroxide and 2,800 ml of water). Characteristics of the copolymer are shown in Table 2.

EXAMPLE 12

An aqueous bisphenol A (BPA) solution (prepared by dissolving 60 kg of BPA in 400,000 ml of a 5% aqueous sodium hydroxide solution), an aqueous bisphenolsulfone solution (prepared by dissolving 65 kg of bisphenolsulfone in 400,000 ml of a 5% aqueous solution of sodium hydroxide), an aqueous solution of pentabromophenol (prepared by dissolving 129 kg of pentabromophenol in 400,000 ml of a 5% aqueous sodium hydroxide solution), methylene chloride and an aqueous triethylamine solution (concentration: 33 g/l) were introduced into a tubular reactor (inner diameter 10 mm; tube length: 10 m) through an orifice plate at rates of 138,000 ml/hr, 17,000 ml/hr, 15,000 ml/hr, 50,000 ml/hr and 100,000 ml/hr, respectively, and phosgene was blown thereinto as a side flow at a rate of 11 kg/hr to effect polymerization.

The above tubular reactor was of the double tube type, and cooling water was passed through the jacket portion to maintain the discharge temperature of the reaction mixture at 25° C.

After the reaction in the tubular reactor, the reaction mixture was further reacted in a 100-liter vessel type reactor for 3 hours. At the end of the time, the resulting copolymer solution was treated in the same manner as in Example 6 to obtain a white powder of the copolymer. The copolymer was analyzed in the same manner as in Example 6. The results are shown in Table 2.

EXAMPLE 13

Preparation of Oligomer

An aqueous bisphenol A solution (the same as used in Example 12), an aqueous pentabromophenol solution (the same as used in Example 12), an aqueous triethylamine solution (the same as used in Example 12), and methylene chloride were introduced in the same tubular reactor as used in Example 7 at rates of 138,000 ml/hr, 15,000 ml/hr, 100,000 ml/hr and 15,000 ml/hr, respectively, and phosgene was blown thereinto as a side flow at a rate of 11 kg/hr to effect polymerization. On allowing the reaction mixture to stand at room temperature, a methylene chloride solution of the copolymer was separated as a lower layer The number average molecular weight of the oligomer was 850, and the concentration of the chloroformate group was 0.7 mol/l.

Production of Polycarbonate 500 ml of the oligomer as obtained above, 250 ml of an aqueous solution of bisphenolsulfone (BPS) and bisphenol A (BPA) (containing of 15.6 g of BPS, 8.6 g of BPA and 13.1 g of sodium hydroxide), 0.11 g of triethylamine and 250 ml of methylene chloride were introduced in a 2-liter reactor, and the reaction was performed while stirring at 500 rpm for 1 hour. After the completion of the reaction, the reaction mixture was treated in the same manner as in Example 6 to obtain a white powder of copolymer. The copolymer thus obtained was analyzed in the same manner as in Example 6. The results are shown in Table 2.

TABLE 2

| Run No. | Mole Fraction of Repeating Unit (I)*1 | Bromine Content of Copolymer (wt %)*2 | Glass Transition Temperature (°C.) | Viscosity Average Molecular Weight*3 | Flow Value (ml/sec) *4 | Izod Impact Strength (notched) (kg·cm/cm)*5 | Flame Retardance *6 | Transparency |
|---|---|---|---|---|---|---|---|---|
| Example 6 | 0.020 | 5.8 | 153.8 | 17,600 | $8.8 \times 10^{-2}$ | 60 | V-0 | transparent |
| Example 7 | 0.045 | 5.8 | 155.1 | 17,400 | $8.9 \times 10^{-2}$ | 58 | V-0 | " |
| Example 8 | 0.073 | 6.1 | 158.3 | 17,800 | $10.0 \times 10^{-2}$ | 60 | V-0 | " |
| Example 9 | 0.022 | 6.6 | 153.7 | 17,700 | $8.5 \times 10^{-2}$ | 69 | V-0 | " |
| Example 10 | 0.024 | 6.2 | 154.2 | 18,800 | $6.4 \times 10^{-2}$ | 76 | V-0 | " |
| Example 11 | 0.043 | 6.4 | 151.9 | 18,100 | $7.6 \times 10^{-2}$ | 58 | V-0 | " |
| Example 12 | 0.017 | 5.6 | 152.9 | 16,900 | $9.5 \times 10^{-2}$ | 55 | V-0 | " |
| Example 13 | 0.018 | 5.7 | 153.2 | 17,300 | $9.2 \times 10^{-2}$ | 57 | V-0 | " |
| Comparative Example 2 | 0 | 5.0 | 151.0 | 22,700 | $7.9 \times 10^{-2}$ | 70 | V-2 | " |
| Comparative Example 3 | 0.098 | 0 | 157.2 | 27,600 | $1.7 \times 10^{-2}$ | 80 | V-2 | " |
| Comparative Example 4 | 0.051 | 5.4 | 160.3 | 21,300 | $8.5 \times 10^{-2}$ | 12 | V-0 | " |

Note:
*1 to *6 are the same as in Table 1.

EXAMPLE 14

85 parts by weight of the polycarbonate as obtained in Example 6 and 15 parts by weight of glass fibers (non-alkali glass subjected to surface treatment using aminosilane; fiber length: 6 mm; fiber diameter 13 μm) were mixed and pelletized by the use of a vented extruder. The pellets thus obtained were injection molded at a molding temperature of 300° C. to obtain a molding.

Physical properties of the molding thus obtained were measured, and the results are shown in Table 3.

COMPARATIVE EXAMPLE 5

The procedure of Example 14 was repeated with the exception that the polycarbonate as obtained in Example 6 was replaced by a commercially available polycarbonate (polycarbonate produced by copolymerization of tetrabromobisphenol A and bisphenol A; bromine content: 8.0 wt%; trade name: Toughlon NB-2500 manufactured by Idemitsu Petrochemical Co., Ltd.).

The results are shown in Table 3.

COMPARATIVE EXAMPLE 6

The procedure of Example 14 was repeated with the exception that the polycarbonate as obtained in Example 6 was replaced by a commercially available polycarbonate (trade name: Toughlon A-2500 manufactured by Idemitsu Petrochemical Co., Ltd.).

The results are shown in Table 3.

EXAMPLE 15

The procedure of Example 14 was repeated wherein 70 parts by weight of the polycarbonate and 30 parts by weight of the glass fibers were used.

The results are shown in Table 3.

EXAMPLE 16

The procedure of Example 14 was repeated wherein 90 parts by weight of the polycarbonate and 10 parts by weight of the glass fibers were used.

The results are shown in Table 3.

REFERENCE EXAMPLE

The procedure of Example 14 was repeated wherein the glass fibers were not compounded.

The results are shown in Table 3.

COMPARATIVE EXAMPLE 7

The procedure of Comparative Example 5 was repeated wherein the glass fibers were not compounded.

The results are shown in Table 3.

COMPARATIVE EXAMPLE 8

The procedure of Comparative Example 6 was repeated wherein the glass fibers were not compounded.

The results are shown in Table 3.

TABLE 3

| Run No. | Amount of Polycarbonate Compounded (parts by weight) | Amount of Glass Fibers Compounded (parts by weight) | Flow Value (ml/sec)*1 | Izod Impact Resistance (notched) (kg·cm/cm)*2 | Modulus in Tension (kg/cm²)*3 | Flame Retardance *4 | Injection Molding Temperature (°C.) |
|---|---|---|---|---|---|---|---|
| Example 14 | 85 | 15 | $6.2 \times 10^{-2}$ | 17 | 51,500 | V-0 | 300 |
| Comparative Example 5 | 85 | 15 | $1.8 \times 10^{-2}$ | 15 | 46,300 | V-0 | 340 |
| Comparative Example 6 | 85 | 15 | $2.3 \times 10^{-2}$ | 19 | 44,600 | V-2 | 340 |
| Example 15 | 70 | 30 | $5.5 \times 10^{-2}$ | 15 | 81,200 | V-0 | 320 |
| Example 16 | 90 | 10 | $7.8 \times 10^{-2}$ | 20 | 49,800 | V-0 | 290 |
| Reference Example | 100 | 0 | $8.8 \times 10^{-2}$ | 60 | 26,700 | V-0 | 280 |
| Comparative Example 7 | 100 | 0 | $3.2 \times 10^{-2}$ | 59 | 22,800 | V-0 | 300 |
| Comparative Example 8 | 100 | 0 | $3.8 \times 10^{-2}$ | 90 | 23,400 | V-2 | 300 |

*1 Same as in Table 1.
*2 Same as in Table 1.
*3 The modulus in tension was measured according to JIS K-7113.
*4 Same as in Table 1.

As can be seen from the above results, the polycarbonate resins of the present invention are excellent in all of flame retardance, fluidity, impact resistance and transparency. For example, UL-94 1/16 inch (thickness) as a measure of flame retardance is V-0; Izod impact strength (notched; ductile failure at ordinary temperature) as a measure of impact resistance is not less than 50 kg·cm/cm; and the flow value as a measure of fluidity is not less than $5 \times 10^{-2}$ ml/sec.

It can also be seen from the above results that the polycarbonate resin compositions of the present invention are excellent in flame retardance and impact resistance, and are excellent in fluidity and, therefore, in moldability.

What is claimed is:

1. A polycarbonate resin consisting essentially of:

(1) a repeating unit (I) of the formula (A):

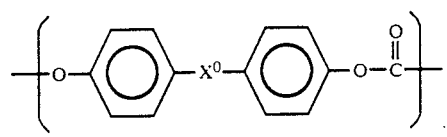

wherein $X^0$ is 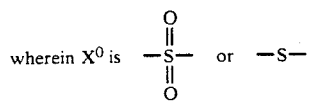

and a repeating unit (II) of the formula (B):

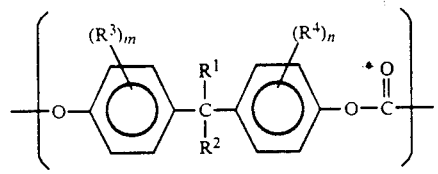

wherein $R^1$ to $R^4$ are each a hydrogen atom or an alkyl group having 1 to 4 carbon atom, and m and n are each an integer of 1 to 4; and (2) a pentahalogenophenoxy group of the formula (C):

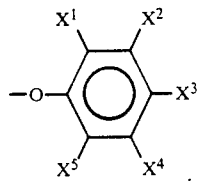

wherein $X^1$ to $X^5$ are each a halogen atom as an end group thereof;

the resin having a viscosity average molecular weight of at least 5,000, wherein a mole fraction of the repeating unit (I) based on the total of the repeating units (I) and (II) is from 0.005 to 0.4.

2. The polycarbonate resin as claimed in claim 1 wherein the repeating unit (I) is

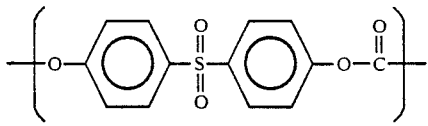

and the repeating unit (II) is

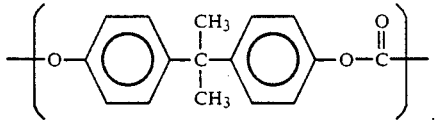

3. The polycarbonate resin as claimed in claim 2 wherein the viscosity average molecular weight is from 10,000 to 30,000.

4. The polycarbonate resin as claimed in claim 2 wherein the pentahalogenophenoxy group is bonded to both ends of the resin.

5. The polycarbonate resin as claimed in claim 2 wherein the pentahalogenophenoxy group is a pentabromophenoxy group.

6. The polycarbonate resin as claimed in claim 1 wherein the repeating unit (I) is

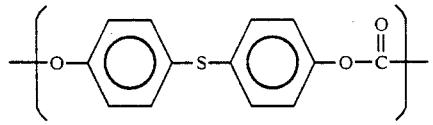

and the repeating unit (II) is

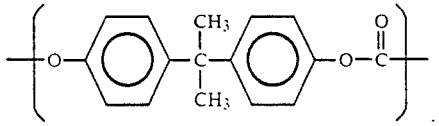

7. The polycarbonate resin as claimed in claim 6 wherein the mole fraction of the repeating unit (I) based on the total of the repeating units (I) and (II) is from 0.005 to 0.4.

8. The polycarbonate resin as claimed in claim 6 wherein the viscosity average molecular weight is from 10,000 to 30,000.

9. The polycarbonate resin as claimed in claim 6 wherein the pentahalogenophenoxy group is bonded to both ends of the resin.

10. The polycarbonate resin as claimed in claim 6 wherein the pentahalogenophenoxy group is pentabromophenoxy group.

11. A process for producing a polycarbonate resin comprising:

(1) a repeating unit (I) of the formula (A):

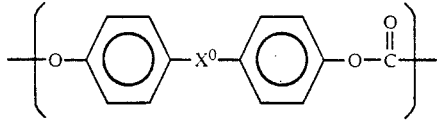

-continued

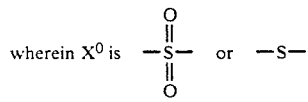

and a repeating unit (II) of the formula (B):

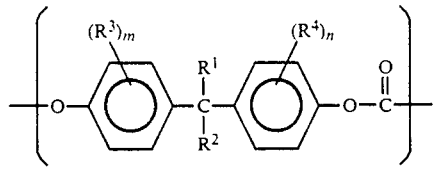

wherein $R^1$ to $R^4$ are each of hydrogen atom or an alkyl group having 1 to 4 carbon atoms, and m and n are each an integer of 1 to 4; and (2) a pentahalogenophenoxy group of the formula (C):
wherein $X^1$ to $X^5$ are each a halogen atom as an end group thereof; the resin having a viscosity average molecular weight of at least 5,000, which process comprises reacting a bisphenol compound of the formula (D):

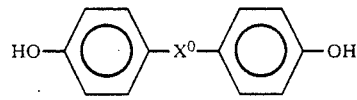

wherein $X^0$ is the same as defined above, a dihydroxy compound of the formula (E):

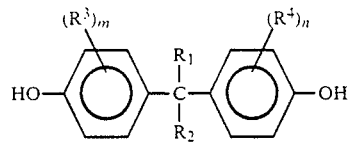

wherein $R^1$ to $R^4$, m and n are the same as defined above, a carbonate-forming compound and a molecular weight controlling agent of a pentahalogenophenol of the formula (F):

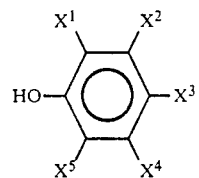

wherein $X^1$ to $X^5$ are the same as defined above.

12. The process as claimed in claim 11 wherein the bisphenol compound is bisphenolsulfone having the formula:

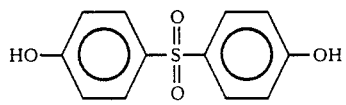

and the dihydroxy compound is 2,2-bis(4-hydroxyphenyl)propane having the formula:

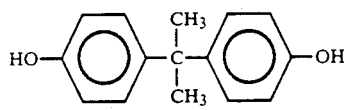

13. The process as claimed in claim 12 wherein the carbonate-forming compound is phosgene.

14. The process as claimed in claim 12 wherein the pentahalogenophenol is pentabromophenol, pentachlorophenol or pentafluorophenol.

15. The process as claimed in claim 12 wherein the pentahalogenophenol is pentabromophenol.

16. The process as claimed in claim 12 wherein the reaction is performed while maintaining a pH of 10 or more.

17. The process as claimed in claim 12 which further comprises reacting in the presence of a dehydrohalogenation agent, said dehydrogenation being a tertiary amine.

18. The process as claimed in claim 17 wherein the tertiary amine is triethylamine.

19. A polycarbonate resin composition comprising
(a) a polycarbonate resin consisting essentially of (1) a repeating unit (I) of the formula (A):

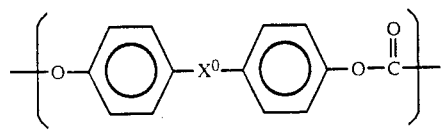

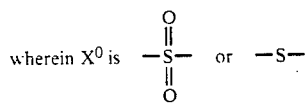

and a repeating unit (II) of the formula (B):

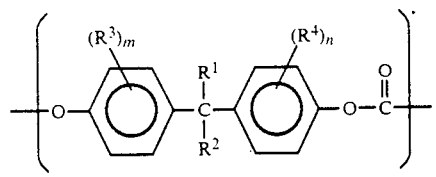

wherein $R^1$ to $R^4$ are each a hydrogen atom or an alkyl group having 1 to 4 carbon atoms, and m and n are each an integer of 1 to 4 and (2) a pentahalogenophenoxy group of the formula (C):

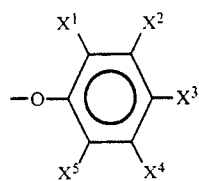

wherein $X^1$ to $X^5$ are each a halogen atom; the resin having a viscosity average molecular weight of at least 5,000, and
(b) a glass fiber.

20. The composition as claimed in claim 19 wherein the repeating unit (I) is

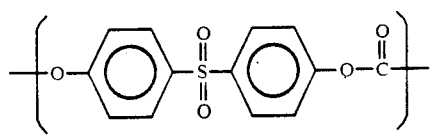

and the repeating unit (II) is

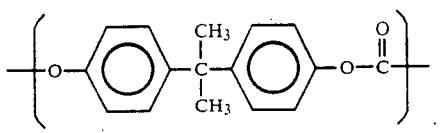

21. The composition as claimed in claim 20 wherein the amount of the glass fiber compounded is 1 to 100 parts by weight per 100 parts by weight of the polycarbonate resin.

22. The composition as claimed in claim 20 wherein the glass fiber has a length of 1 to 8 mm and a diameter of not more than 20 μm.

23. The composition as claimed in claim 20 wherein the glass fiber is subjected to a surface treatment using a silane coupling agent.

24. The polycarbonate resin of claim 2, wherein said mole fraction is 0.02 to 0.2.

25. The polycarbonate resin of claim 7, wherein said mole fraction is 0.02 to 0.2.

26. The polycarbonate resin as claimed in claim 24 wherein the viscosity average molecular weight is form 10,000 to 30,000.

27. The polycarbonate resin as claimed in claim 26 wherein the pentahalogenophenoxy group is bonded to both ends of the polymer.

28. The polycarbonate resin as claimed in claim 27 wherein the pentahalogenophenoxy group is a pentabromophenoxy group.

29. The polycarbonate resin as claimed in claim 25 wherein the viscosity average molecular weight is from 10,000 to 30,000.

30. The polycarbonate resin as claimed in claim 29 wherein the pentahalogenophenoxy group is bonded to both ends of the polymer.

31. The polycarbonate resin as claimed in claim 30 wherein the pentahalogenophenoxy group is a pentabromophenoxy group.

32. The composition as claimed in claim 23 wherein the glass fiber has a length of 2 to 7 mm and a diameter of 3 to 15 μm and the amount of glass fiber is 5 to 50 parts by weight per 100 parts by weight of the polycarbonate resin.

33. The composition as claimed in claim 32 wherein the mole fraction of the repeating unit (I) based on the total of the repeating units (I and II) is from 0.02 to 0.2; the viscosity average molecular weight is from 10,000 to 30,000; and wherein the pentahogenophenoxy group is a pentabromophenoxy group which is bonded to both ends of the polymer.

34. The polycarbonate resin according to claim 1, wherein said mole fraction is 0.02 to 2.

* * * * *

UNITED STATES PATENT AND TRADEMARK OFFICE
CERTIFICATE OF CORRECTION

PATENT NO. : 5,037,937                                         Page 1 of 2

DATED      : August 6, 1991

INVENTOR(S) : KOMATSU et al

It is certified that error appears in the above-identified patent and that said Letters Patent is hereby corrected as shown below:

TITLE PAGE:

Section [56] References Cited, insert the following references as indicated below:

Under U.S. PATENT DOCUMENTS -

3,751,400   8/1973   Crennan et al............260/47
4,075,119   2/1978   Schmidt et al............252/182
4,281,101   7/1981   Schreckenberg et al.....528/196

Under FOREIGN PATENT DOCUMENTS -

2 310 370   5/1976   France
699 028B    11/1967  France
0 006516    1/1980   Europe Left column, below Section [22], insert the following:

--Section [63] Related U.S. Application Data -

Continuation of Serial No.139,615, December 30, 1987, abandoned.--

UNITED STATES PATENT AND TRADEMARK OFFICE
CERTIFICATE OF CORRECTION

PATENT NO. : 5,037,937
DATED : August 6, 1991
INVENTOR(S) : KOMATSU et al

It is certified that error appears in the above-identified patent and that said Letters Patent is hereby corrected as shown below:

Column 20, line 21 (Claim 11), after "formula (C):", insert the following formula:

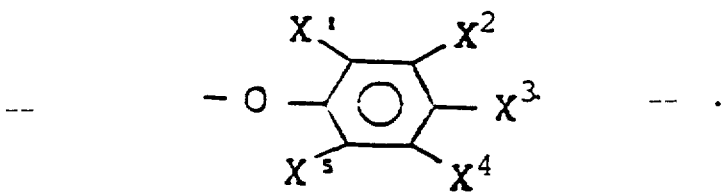

Signed and Sealed this

Sixth Day of July, 1993

MICHAEL K. KIRK

Attesting Officer     Acting Commissioner of Patents and Trademarks